United States Patent
Su et al.

(10) Patent No.: US 10,324,279 B2
(45) Date of Patent: Jun. 18, 2019

(54) OPTICAL LENS

(71) Applicant: Young Optics Inc., Hsinchu Science Park (TW)

(72) Inventors: Yuan-Hung Su, Hsinchu Science Park (TW); Bing-Ju Chiang, Hsinchu Science Park (TW); Kuo-Chuan Wang, Hsinchu Science Park (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 80 days.

(21) Appl. No.: 15/616,331

(22) Filed: Jun. 7, 2017

(65) Prior Publication Data

US 2017/0357082 A1    Dec. 14, 2017

(30) Foreign Application Priority Data

Jun. 8, 2016    (TW) .............................. 105118285 A (51) Int. Cl.
   *G02B 15/16*    (2006.01)
   *G02B 15/173*   (2006.01)
   *G02B 7/04*     (2006.01)

(52) U.S. Cl.
   CPC ............... *G02B 15/16* (2013.01); *G02B 7/04* (2013.01); *G02B 15/173* (2013.01)

(58) Field of Classification Search
   CPC .... G02B 15/16; G02B 15/173; G02B 15/161; G02B 15/163; G02B 15/167
   USPC ................................ 359/676, 680, 682–685
   See application file for complete search history.

(56) References Cited

U.S. PATENT DOCUMENTS

| 4,844,599 | A | 7/1989 | Ito |
| 4,991,942 | A | 2/1991 | Fujibayashi et al. |
| 5,071,237 | A | 12/1991 | Braat et al. |
| 7,068,440 | B1 * | 6/2006 | Nakatani ............ G02B 15/161 359/676 |
| 7,092,169 | B1 | 8/2006 | Chang |
| 7,116,490 | B1 | 10/2006 | Chuang |
| 7,158,313 | B2 * | 1/2007 | Chang ............... G02B 15/173 359/676 |
| 7,502,171 | B2 * | 3/2009 | Morooka ............ G02B 15/173 359/676 |

(Continued)

FOREIGN PATENT DOCUMENTS

| CN | 101051113 A | 10/2007 |
| CN | 102062933 A | 5/2011 |

(Continued)

OTHER PUBLICATIONS

Intellectual Property Adminstration of the People'S Republic of China, Notice of Allowance with Search Report, dated Apr. 2, 2019, 7 pages.

*Primary Examiner* — Zachary W Wilkes
(74) *Attorney, Agent, or Firm* — Muncy, Geissler, Olds & Lowe, P.C.

(57) ABSTRACT

On embodiment of the invention discloses an optical lens including five lens group and an aperture stop. Each lens group includes at least one lens with refractive power, and the aperture stop is fixed in a position between a second lens group and a third lens group. Further, a distance between a first lens group and a fifth lens group remains fixed during zooming or focusing, and respective distances of the second lens group and a fourth lens group relative to the fifth lens group vary during zooming or focusing.

19 Claims, 3 Drawing Sheets

(56) References Cited

U.S. PATENT DOCUMENTS

| | | | | |
|---|---|---|---|---|
| 7,593,165 | B2* | 9/2009 | Souma | G02B 9/60 |
| | | | | 359/676 |
| 8,441,557 | B2* | 5/2013 | Anzawa | G02B 15/173 |
| | | | | 348/240.3 |
| 8,564,711 | B2* | 10/2013 | Morooka | G02B 13/18 |
| | | | | 348/294 |
| 8,693,106 | B2* | 4/2014 | Wei | G02B 15/24 |
| | | | | 359/676 |
| 8,773,779 | B2 | 7/2014 | Take | |
| 2005/0275735 | A1* | 12/2005 | Nanjo | G02B 15/173 |
| | | | | 348/240.3 |
| 2012/0147253 | A1 | 6/2012 | Anzawa | |
| 2015/0241672 | A1 | 8/2015 | Masugi | |
| 2015/0253545 | A1 | 9/2015 | Abe | |

FOREIGN PATENT DOCUMENTS

| | | |
|---|---|---|
| CN | 101887164 B | 12/2011 |
| JP | 2009042563 A | 2/2009 |
| JP | 2010102096 A | 5/2010 |
| JP | 2012141646 A | 7/2012 |
| JP | 2013182259 A | 9/2013 |
| JP | 2017187639 A | 10/2017 |
| WO | WO2013/125603 A1 | 8/2013 |
| WO | WO2013/151153 A1 | 10/2013 |

* cited by examiner

OPTICAL LENS

BACKGROUND OF THE INVENTION a. Field of the Invention

The invention relates generally to an optical lens, and more particularly to an optical lens having at least one movable lens group.

b. Description of the Related Art

Recent advances in technology have led to the development of various types of optical lenses, such as a surveillance camera disclosed in U.S. patent publication no. 2015/024167 (briefly referred to as '167 application) or U.S. Pat. No. 4,844,599 (briefly referred to as '599 patent).

'167 application discloses that multiple lens groups of a zoom lens with a high zoom ratio need to move in unison with each other to perform zooming and focusing operations. This, however, may increase design complexity, constrain manufacturing tolerances, require an elevated level of precision, and therefore increase fabrication costs of the zoom lens.

Further, '599 patent discloses an aperture stop that may move during zooming and focusing to allow for greater design freedom. However, in practical application, a movable aperture stop is normally realized by a complicated mechanism that may reduce manufacturing yield and increase fabrication costs.

BRIEF SUMMARY OF THE INVENTION

According to one aspect of the present disclosure, an optical lens includes five lens group and an aperture stop. Each lens group include at least one lens with refractive power, and the aperture stop may be disposed or fixed in a position between the second lens group and the third lens group denoted in an ascending order from a magnified side to a minified side. Further, a distance between the first lens group and the fifth lens group denoted in the ascending order remains fixed during zooming or focusing, and respective distances of the second lens group and the fourth lens group relative to the fifth lens group may vary during zooming or focusing to provide trade-off between zooming effects and optical performance.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting.

Figure 1:
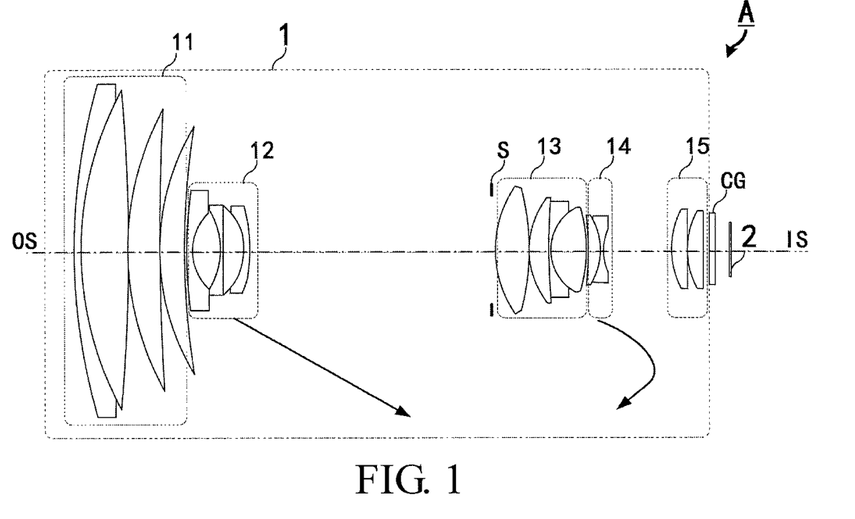
FIG. 1 shows a schematic diagram of an optical system according to a first embodiment of the invention.

The invention relates to an optical system and an optical lens used therein. FIG. 1 shows a schematic diagram of an optical system according to a first embodiment of the invention. As shown in FIG. 1, the optical system A includes an optical lens 1 and an image sensor 2. The optical lens 1 may form an image at an image surface or image plane, and the image surface or image plane may be coplanar and in substantially the same shape with a light-sensing surface of an image sensor B.

The image sensor 2, such as a CCD, CMOS or a photographic film, is allowed to convert image beams into an image. The image sensor 2 may have a rectangular light-sensing surface with the dimensions 1/2.5 inch (5.76 mm in length×4.29 mm in width), but the invention is not limited thereto. The light-sensing surface may have a diagonal length L defined as a linear distance between two points furthest away from each other on the light-sensing surface. An image circle/height Ic may be set on the light-sensing surface to have a length of half the diagonal length L. For example, the diagonal length L may be in the range of 5-43 mm, and the image sensor 2 with the dimensions 1/2.5 inch may have a diagonal length L of about 7.182 mm.

In this embodiment, the optical lens 1 may be disposed between a magnified side OS and a minified side IS. In case the optical lens 1 is utilized as an image capturing lens, the magnified side OS of the image capturing lens refers to the side facing the object to be captured, and the minified side IS of the image capturing lens refers to the side facing the sensor, where the image sensor 2 is disposed at the minified side IS of the optical lens 1. Referring to FIG. 1, the optical lens 1 may include, in order from the magnified side OS to the minified side IS along an optical axis, a first lens group 11, a second lens group 12, an aperture stop S, a third lens group 13, a fourth lens group 14, a fifth lens group 15 and a cover glass CG. By taking other optical parameters, including optical path difference, into consideration, optical components, such as color filter or cover glass CG, having zero refractive power can be optionally disposed between the magnified side OS and the minified side IS. Further, the aperture stop S may be arranged separate from a lens or integrally formed on a lens surface, but the invention is not limited thereto.

In this embodiment, each of the first lens group 11, the third lens group 13 and the fifth lens group 15 is a fixed lens group. That is, these groups are stationary and maintain respective fixed distances among each other during zooming and focusing of the optical lens 1. In addition, a fixed lens group remains a fixed distance from the image sensor 2 during zooming and focusing of the optical lens 1. Besides, the aperture stop may possess the same characteristic as a fixed lens group, where the aperture stop is stationary and maintains a fixed distance relative to the other fixed lens groups during zooming and focusing.

In contrast, the second lens group 12 and the fourth lens group 14 are movable lens groups. That is, a distance of a movable lens group relative to a fixed lens group (such as the first lens group 11 or the fifth lens group 15) or a fixed component (such as the image sensor 2) may vary during zooming and focusing.

Further, FIG. 1 shows arrows under the second lens group 12 and the fourth lens group 14 indicating their respective moving directions when the optical lens 1 is changed from a wide-angle position to an intermediate zoom position and then to a telephoto position. Specifically, when the optical lens 1 is changed from a wide-angle position to an intermediate zoom position and then to a telephoto position, the second lens group 12 is moved unidirectionally toward the fifth lens group 15. In comparison, the fourth lens group 14 is moved toward the fifth lens group 15 or the image sensor 2 when the optical lens 1 is changed from a wide-angle position to an intermediate zoom position, and the fourth lens group 14 is moved toward the first lens group 11 or away from the image sensor 2 when the optical lens is changed from an intermediate zoom position to a telephoto position. Further, each moveable lens group is moved in a reverse direction when the optical lens 1 is changed from a telephoto position to a wide-angle position.

In this embodiment, refractive powers of the first lens group 11 to the fifth lens group 15 are positive, negative, positive, negative and positive, and having a total number of 16 lenses having refractive power. The detailed optical data of the optical system A are shown in Tables 1-3 below.

TABLE 1

| Surface number | Radius (mm) | Interval (mm) | Refractive index (nd) | Abbe number (vd) |
|---|---|---|---|---|
| S1 | 82.40 | 1.20 | 2.00 | 25.45 |
| S2 | 48.95 | 6.29 | 1.43 | 95.10 |
| S3 | −343.32 | 0.10 | | |
| S4 | 48.60 | 4.32 | 1.59 | 68.62 |
| S5 | 489.53 | 0.10 | | |
| S6 | 33.58 | 3.46 | 1.49 | 81.60 |
| S7 | 72.20 | Variable | | |
| S8 | 19.69 | 0.50 | 1.88 | 40.80 |
| S9 | 6.81 | 4.17 | | |
| S10 | −12.58 | 0.50 | 1.88 | 40.80 |
| S11 | 79.40 | 2.41 | 2.00 | 19.31 |
| S12 | −12.32 | 0.42 | | |
| S13* | −9.78 | 0.70 | 1.80 | 40.42 |
| S14* | −56.35 | Variable | | |
| S15 | Inf. | 0.40 | | |
| S16* | 12.60 | 4.09 | 1.77 | 49.98 |
| S17* | −54.95 | 0.10 | | |
| S18 | 11.79 | 2.43 | 1.49 | 81.60 |
| S19 | 35.27 | 0.50 | 1.90 | 31.31 |
| S20* | 6.42 | 3.78 | 1.49 | 81.54 |
| S21* | −29.10 | Variable | | |
| S22 | −64.42 | 1.56 | 2.00 | 29.13 |
| S23 | −10.51 | 0.50 | 1.80 | 39.58 |
| S24 | 7.64 | Variable | | |
| S25 | 30.70 | 1.83 | 1.43 | 95.10 |
| S26 | −23.16 | 0.10 | | |
| S27 | 9.37 | 2.33 | 1.62 | 58.12 |
| S28 | −666.95 | 0.10 | | |
| S29 | Inf. | 0.80 | | |
| S30 | Inf. | 0.80 | 1.51 | 64.14 |
| S31 | Inf. | 2.00 | | |

Table 1 lists optical parameter values of each lens of the optical system A. Each asterisk in the field heading of "surface number" indicates an aspheric surface, and the lens surface without this denotation is a spherical surface. Further, the surface number indicates an ascending order, from the magnified side to the minified side, of all surfaces of optical components in the optical system A.

As can be verified from the above table, both surfaces of the fourth lens of the second lens group 12 are aspheric surfaces, and both surfaces of the first lens of the third lens group 13 are aspheric surfaces. Further, each of the first lens group 11, the second lens group 12, the third lens group 13 and the fourth lens group 14 includes a cemented lens, where the third lens group 13 includes a cemented triplet and the rest each has a cemented doublet. The fourth lens group 14 includes a lens with negative refractive power. Since the second lens group 12, the third lens group 13 or the fourth lens group 14 is provided with an aspheric lens, the resolution of each section of the entire focal length is enhanced. Further, chromatic abbreviations of the optical lens 1 can be corrected by providing each lens group with a cemented lens and the fourth lens group 14 with a negative lens.

The values of aspheric coefficients of each aspheric surface are listed in Table 2 below.

TABLE 2

| | Surface number | | | | |
|---|---|---|---|---|---|
| | S13* | S14* | S16* | S17* | S21* |
| $4^{th}$ | 7.71E−05 | −3.4E−05 | −5.1E−05 | 4.44E−05 | 9.13E−05 |
| $6^{th}$ | −1E−05 | −9.3E−06 | −2.1E−07 | −3.7E−07 | −1.4E−07 |
| $8^{th}$ | 2.5E−07 | 2.69E−07 | −2.6E−09 | −4.6E−10 | 1.97E−08 |
| $10^{th}$ | −6.3E−10 | −1.5E−09 | −1.2E−11 | 8.52E−12 | −1.8E−09 |

The aspheric surfaces are expressed in accordance with the following equation:

$$Z = \frac{cr^2}{1+\sqrt{1-(1+k)c^2 r^2}} + A_2 r^2 + A_4 r^4 + A_6 r^6 + A_8 r^8 + A_{10} r^{10} + A_{12} r^{12} + A_{14} r^{14} + A_{16} r^{16} + \ldots \quad \text{equation (1)}$$

Table 3 lists the values of the item "variable" shown in FIG. 1. Table 3 also lists various values of an interval or a thickness between each lens surface and its neighboring surface in the wide-angle position, intermediate zoom position and telephoto position of the optical lens 1. In this embodiment, the wide-angle position, the intermediate zoom position and the telephoto position of the optical lens 1 respectively correspond to an effective focal length of 5 mm, 61 mm and 200 mm of the optical lens 1. Note the values of the effective focal length corresponding to the wide-angle position, intermediate zoom position and telephoto position may be adjusted to adapt different lens designs. When the optical lens 1 is in the wide-angle position and the telephoto position, the zoom ratio is respectively at a minimum (such as ×1) and a maximum (such as ×40). Further, the optical lens 1 in the wide-angle position and in the telephoto position have mutually different values of an F-number. In this embodiment, the F-number of the optical lens 1 is in the range of 1.7 (wide-angle position) to 5.1 (telephoto position). Normally, an F-number of the optical lens may decrease as an effective aperture of an optical lens increases. For example, in case an effective aperture of an optical lens is larger than 2, an F-number of the optical lens may be 1.7.

TABLE 3

| Surface number | EFL = 5 mm wide-angle position | EFL = 61 mm intermediate zoom position | EFL = 200 mm telephoto position |
|---|---|---|---|
| S7 | 0.20 | 28.70 | 33.57 |
| S14 | 34.7 | 6.2 | 1.33 |
| S21 | 1.82 | 9.95 | 1.72 |
| S24 | 10.58 | 2.44 | 10.68 |

Further, in this embodiment, a total track length (TTL) of the optical lens 1 is about 92.79 mm. The total track length of the present invention is defined as a linear distance between a first intersection and a second intersection, where the first intersection is formed by crossing a magnified-side surface of a lens with refractive power closest to the magnified side to the optical axis, and the second intersection is formed by crossing an image plane to the optical axis. In the present embodiment, the image plane is formed on the image sensor 2 Alternatively, a mechanical length of the optical lens 1 is defined as a total length of an optical mechanism, namely a distance along the optical axis between two lenses with refractive power furthest away from each other in the optical lens 1. Therefore, when the first lens group (closest to the magnified side) and the last lens group (closest to the minified side) are fixed, the mechanical length remains fixed under different focal lengths of the optical lens 1.

The following tables have the same format as that of Tables 1-3. Therefore, the meaning of each item in the following tables is not repeatedly described for clarity. Similarly, only the differences of the following embodiments as compared with the above embodiment will be described, and the content omitted may refer to the above embodiment previously described and thus not described repeatedly in detail below.

Figure 2:
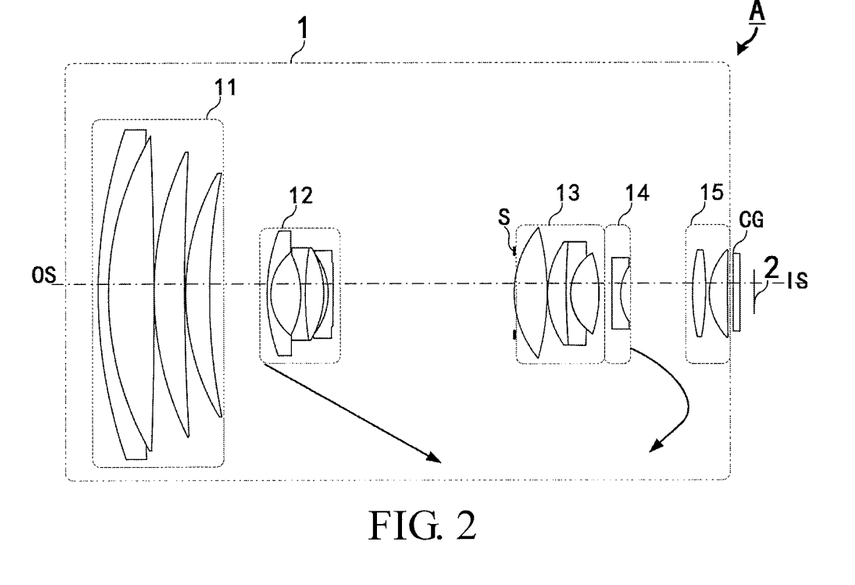
FIG. 2 shows a schematic diagram of an optical system according to a second embodiment of the invention.

FIG. 2 shows a schematic diagram of an optical system according to a second embodiment of the invention. The detailed optical data of the optical system A according to the second embodiment are shown in Tables 4-6 below.

TABLE 4

| Surface number | Radius (mm) | Interval (mm) | Refractive index (nd) | Abbe number (vd) |
|---|---|---|---|---|
| S1 | 77.77 | 1.20 | 2.00 | 25.45 |
| S2 | 45.96 | 6.47 | 1.49 | 81.60 |
| S3 | −1886.93 | 0.10 | | |
| S4 | 47.34 | 4.48 | 1.59 | 68.62 |
| S5 | 354.89 | 0.10 | | |
| S6 | 36.29 | 3.36 | 1.49 | 81.60 |
| S7 | 81.64 | Variable | | |
| S8 | 26.07 | 0.52 | 1.88 | 40.80 |
| S9 | 7.66 | 4.30 | | |
| S10 | −13.86 | 0.50 | 1.88 | 40.80 |
| S11 | 31.96 | 2.73 | 2.00 | 19.31 |
| S12 | −14.07 | 0.61 | | |
| S13* | −10.31 | 0.70 | 1.80 | 40.42 |
| S14* | −167.47 | Variable | | |
| S15 | Inf. | 0.10 | | |
| S16* | 13.33 | 4.64 | 1.77 | 49.98 |
| S17* | −28.43 | 0.10 | | |
| S18 | 13.29 | 2.72 | 1.49 | 81.60 |
| S19 | 154.95 | 0.50 | 1.90 | 31.31 |
| S20 | 7.19 | 4.04 | 1.49 | 81.60 |
| S21 | −19.92 | Variable | | |
| S22* | −134.73 | 1.16 | 1.74 | 45.05 |
| S23* | 7.64 | Variable | | |
| S24 | 32.87 | 1.68 | 1.48 | 70.40 |
| S25 | −51.43 | 0.57 | | |
| S26 | 9.66 | 2.60 | 1.74 | 43.93 |
| S27 | 144.39 | 0.10 | | |
| S28 | Inf. | 0.80 | | |
| S29 | Inf. | 0.80 | 1.51 | 64.14 |
| S30 | Inf. | 2.00 | | |

TABLE 5

| Surface number | S13* | S14* | S16* | S17* | S22* | S23* |
|---|---|---|---|---|---|---|
| $4^{th}$ | 1.45E−05 | −7.52E−05 | −5.78E−05 | 9.42E−05 | 8.55E−05 | −4.32E−05 |
| $6^{th}$ | −2.65E−06 | −2.19E−06 | 8.44E−08 | −1.53E−07 | −8.28E−07 | 2.35E−06 |
| $8^{th}$ | 8.1E−08 | 7.56E−08 | −2.24E−09 | −3.11E−09 | −1.19E−07 | −5.14E−07 |
| $10^{th}$ | −3.99E−11 | −1.7E−10 | −8.17E−12 | 1.65E−11 | 4.67E−09 | 1.55E−08 |

TABLE 6

| Surface number | EFL = 4.7 mm wide-angle position | EFL = 57 mm intermediate zoom position | EFL = 189 mm telephoto position |
|---|---|---|---|
| S7 | 0.1 | 28.37813 | 33.60597 |
| S14 | 33.60595 | 5.32783 | 0.1 |
| S21 | 0.682852 | 9.947892 | 3.113815 |
| S23 | 11.5024 | 2.237371 | 9.071467 |

As can be verified from the above tables, a total number of lenses with refractive power of all the lens groups is 15. The fourth lens group 14 consists of only one singlet lens. Refractive powers of the first lens group 11 to the fifth lens group 15 are positive, negative, positive, negative and positive. In this embodiment, each of the last lens of the second lens group 12, the first lens of the third lens group 13, and the first lens of the fourth lens group 14 includes at least one aspheric surface. As used herein, the term "first lens" refers to a lens that is closest to the magnified side compared with any other lens in the same lens group, and the term "last lens" refers to a lens that is furthest way from the magnified side compared with any other lens in the same lens group. Each of the first lens group 11, the second lens group 12 and the third lens group 13 includes at least one cemented lens and their respective cemented lenses are a cemented doublet, cemented doublet and cemented triplet. Besides, in this embodiment, a total track length (TTL) of the optical lens 1 is about 92.77 mm, an F-number of the optical lens 1 is in the range of 1.6 (wide-angle position) to 4.8 (telephoto position), and a maximum zoom ratio of the optical lens 1 is about 40. The zooming and focusing operations of each lens group are similar to those of the first embodiment and thus are not repeatedly explained in detail.

Figure 3:
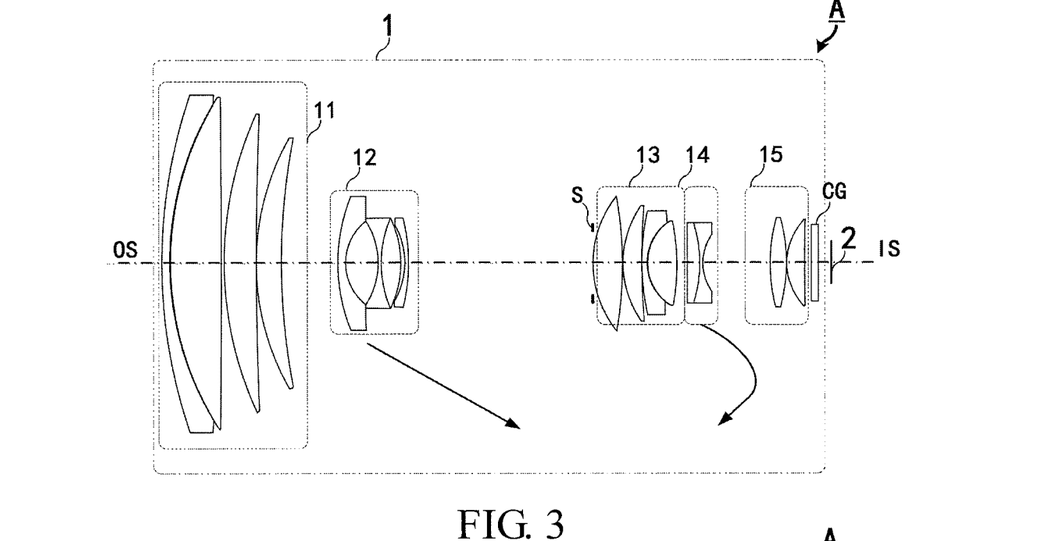
FIG. 3 shows a schematic diagram of an optical system according to a third embodiment of the invention.

FIG. 3 shows a schematic diagram of an optical system according to a third embodiment of the invention. The detailed optical data of the optical system A according to the third embodiment are shown in Tables 7-9 below.

TABLE 7

| Surface number | Radius (mm) | Interval (mm) | Refractive index (nd) | Abbe number (vd) |
|---|---|---|---|---|
| S1 | 78.42 | 1.20 | 2.00 | 25.45 |
| S2 | 46.36 | 6.85 | 1.49 | 81.60 |
| S3 | −1428.44 | 0.10 | | |
| S4 | 47.63 | 4.76 | 1.59 | 68.62 |
| S5 | 416.51 | 0.10 | | |
| S6 | 36.22 | 3.26 | 1.49 | 81.60 |
| S7 | 78.98 | Variable | | |
| S8* | 48.49 | 1.00 | 1.80 | 40.42 |
| S9* | 8.27 | 4.42 | | |
| S10 | −11.84 | 0.50 | 1.88 | 40.80 |
| S11 | 16.64 | 2.53 | 2.00 | 19.31 |
| S12 | −22.61 | 0.70 | | |
| S13 | −11.68 | 0.50 | 1.88 | 40.80 |
| S14 | −27.23 | Variable | | |
| S15 | Inf. | 0.10 | | |
| S16* | 13.18 | 4.15 | 1.77 | 49.98 |

TABLE 7-continued

| Surface number | Radius (mm) | Interval (mm) | Refractive index (nd) | Abbe number (vd) |
|---|---|---|---|---|
| S17* | −35.57 | 0.10 | | |
| S18 | 15.11 | 2.68 | 1.49 | 81.60 |
| S29 | 336.87 | 0.10 | | |
| S20 | 41.48 | 0.50 | 1.91 | 31.60 |
| S21 | 6.95 | 4.14 | 1.49 | 81.60 |
| S22 | −25.25 | Variable | | |
| S23* | 271.75 | 1.61 | 1.82 | 24.05 |
| S24 | −18.45 | 0.50 | 1.80 | 34.96 |
| S25 | 7.35 | Variable | | |
| S26 | 29.33 | 2.16 | 1.51 | 52.43 |
| S27 | −22.21 | 0.10 | | |
| S28 | 9.64 | 2.48 | 1.49 | 81.60 |
| S29 | 295.23 | 0.10 | | |
| S30 | Inf. | 0.80 | | |
| S31 | Inf. | 0.80 | 1.51 | 64.14 |
| S32 | Inf. | 2.00 | | |

TABLE 8

| | Surface number | | | | |
|---|---|---|---|---|---|
| | S8* | S9* | S16* | S17* | S23* |
| 4th | 7.6651E−05 | 2.332E−05 | −6.1E−05 | 8.86E−05 | 4.14E−05 |
| 6th | 4.9749E−07 | 2.957E−06 | −6.8E−08 | −3.4E−07 | 7.72E−07 |
| 8th | 3.0951E−10 | −8.91E−08 | −8.3E−10 | 1.62E−10 | −5.41E−08 |
| 10th | −2.185E−11 | 4.908E−09 | −1.7E−11 | −3.2E−12 | 1.84E−09 |

TABLE 9

| Surface number | EFL = 4.7 mm wide-angle position | EFL = 56.8 mm intermediate zoom position | EFL = 187 mm telephoto position |
|---|---|---|---|
| S7 | 0.20 | 28.34 | 33.51 |
| S14 | 33.41 | 5.26 | 0.10 |
| S22 | 0.33 | 9.76 | 2.32 |
| S25 | 10.60 | 1.17 | 8.61 |

As can be verified from the above tables, a total number of lenses with refractive power of all the lens groups is 16. Refractive powers of the first lens group 11 to the fifth lens group 15 are positive, negative, positive, negative and positive. The first lens of each of the second lens group 12, the third lens group 13 and the fourth lens group 14 includes at least one aspheric surface. Each of the first lens group 11, the second lens group 12, the third lens group 13 and the fourth lens group 14 includes at least one cemented lens that is a cemented doublet. Besides, in this embodiment, a total track length (TTL) of the optical lens 1 is about 92.78 mm, an F-number of the optical lens 1 is in the range of 1.6 (wide-angle position) to 4.8 (telephoto position), and a maximum zoom ratio of the optical lens 1 is about 40. The zooming and focusing operations of each lens group are similar to those of the first embodiment and thus are not repeatedly explained in detail.

Figure 4:
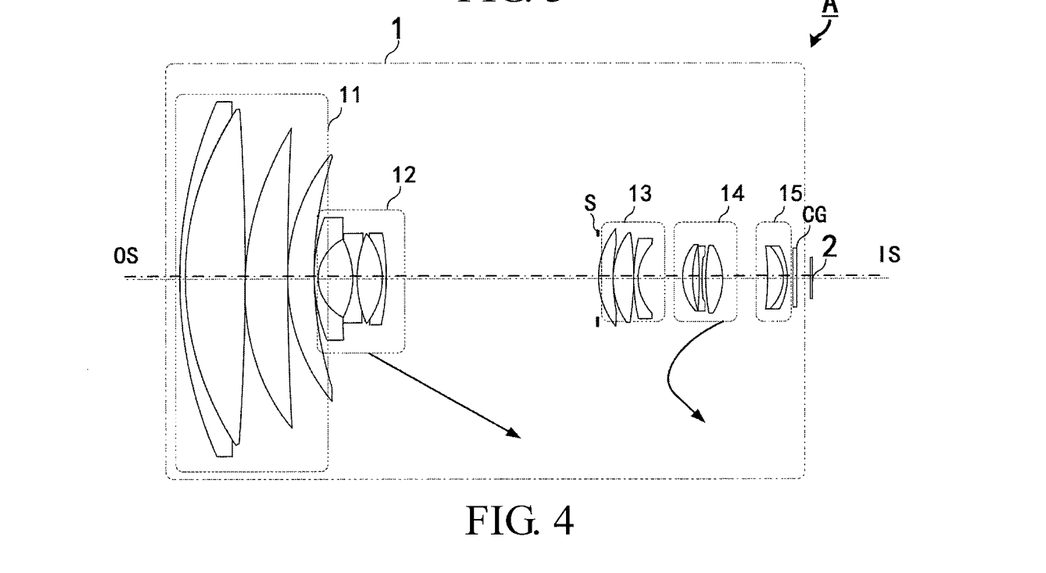
FIG. 4 shows a schematic diagram of an optical system according to a fourth embodiment of the invention.

FIG. 4 shows a schematic diagram of an optical system according to a fourth embodiment of the invention. The detailed optical data of the optical system A according to the fourth embodiment are shown in Tables 10-12 below.

TABLE 10

| Surface number | Radius (mm) | Interval (mm) | Refractive index (nd) | Abbe number (vd) |
|---|---|---|---|---|
| S1 | 81.28 | 0.50 | 1.92 | 20.87 |
| S2 | 50.87 | 8.92 | 1.43 | 95.1 |
| S3 | −360.14 | 0.10 | | |
| S4 | 46.48 | 6.28 | 1.43 | 95.1 |
| S5 | 459.16 | 0.10 | | |
| S6 | 34.50 | 3.74 | 1.76 | 48.44 |
| S7 | 62.97 | Variable | | |
| S8* | 33.79 | 0.50 | 1.89 | 31.38 |
| S9 | 7.13 | 5.33 | | |
| S10 | −13.48 | 0.50 | 1.88 | 40.76 |
| S11 | 33.54 | 0.10 | | |
| S12 | 22.68 | 3.44 | 1.92 | 20.88 |
| S13 | −14.43 | 0.23 | | |
| S14 | −12.82 | 0.50 | 1.85 | 42.07 |
| S15 | −42.05 | Variable | | |
| S16 | Inf. | 0.10 | | |
| S17* | 12.11 | 2.12 | 1.86 | 40.08 |
| S18* | 33.05 | 0.10 | | |
| S19 | 12.97 | 3.00 | 1.51 | 64.93 |
| S20 | −48.67 | 0.20 | | |
| S21 | 43.22 | 0.50 | 1.87 | 26.9 |
| S22 | 8.75 | Variable | | |
| S23* | 9.51 | 1.58 | 1.68 | 55.24 |
| S24* | 21.69 | 0.92 | | |
| S25 | −85.63 | 0.50 | 1.89 | 30.21 |
| S26 | 27.61 | 0.68 | | |
| S27 | 55.58 | 2.30 | 1.49 | 81.42 |
| S28 | −10.04 | Variable | | |
| S29 | −22.68 | 1.83 | 1.51 | 52.43 |
| S30 | −7.65 | 0.10 | | |
| S31 | −7.46 | 0.50 | 1.91 | 22.37 |
| S32 | −12.12 | 0.10 | | |
| S33 | Inf. | 1.00 | | |
| S34 | Inf. | 0.50 | 1.51 | 64.14 |
| S35 | Inf. | 2.00 | | |

TABLE 11

| | Surface number | | | | |
|---|---|---|---|---|---|
| | S8* | S17* | S18* | S23* | S24* |
| 4th | 5.79E−05 | −5.09E−05 | 2.043E−05 | 0.000288 | 0.000663 |
| 6th | −5.3E−07 | −2.81E−07 | 3.091E−08 | 4.53E−06 | 6.77E−06 |
| 8th | 2.55E−09 | 1.192E−09 | 4.642E−09 | 4.99E−09 | 2.37E−08 |
| 10th | −1.4E−11 | −1.07E−11 | −6.012E−12 | 2.66E−09 | 3.48E−09 |

TABLE 12

| Surface number | EFL = 4.8 mm wide-angle position | EFL = 63 mm intermediate zoom position | EFL = 138 mm telephoto position |
|---|---|---|---|
| S7 | 0.10 | 27.15 | 31.29 |
| S15 | 31.29 | 4.24 | 0.10 |
| S22 | 6.45 | 0.07 | 13.53 |
| S28 | 7.18 | 13.56 | 0.10 |

As can be verified from the above tables, a total number of lenses with refractive power of all the lens groups is 16. Refractive powers of the first lens group 11 to the fifth lens group 15 are positive, negative, positive, positive and positive. Each of the third lens group 13 and the fourth lens group 14 includes three lenses. The first lens of each of the second lens group 12, the third lens group 13 and the fourth lens group 14 includes an aspheric surface. The first lens group 11 includes a cemented lens that is a cemented doublet. Besides, in this embodiment, a total track length (TTL) of the optical lens 1 is about 91.31 mm, an F-number of the optical lens 1 is in the range of 1.6 (wide-angle position) to 3.3 (telephoto position), and a maximum zoom ratio of the optical lens 1 is about 28.75. When the optical lens 1 is changed from a wide-angle position to an intermediate zoom position, the fourth lens group 14 is moved toward the first lens group 11 (away from the fifth lens group 15 and the image sensor 2). When the optical lens 1 is changed from the intermediate zoom position to a telephoto position, the fourth lens group 14 is moved toward the fifth lens group 15 and the image sensor 2 (away from the first lens group 11). The zooming and focusing operations of each lens group except for the fourth lens group are similar to those of the first embodiment and thus are not repeatedly explained in detail.

Figure 5:
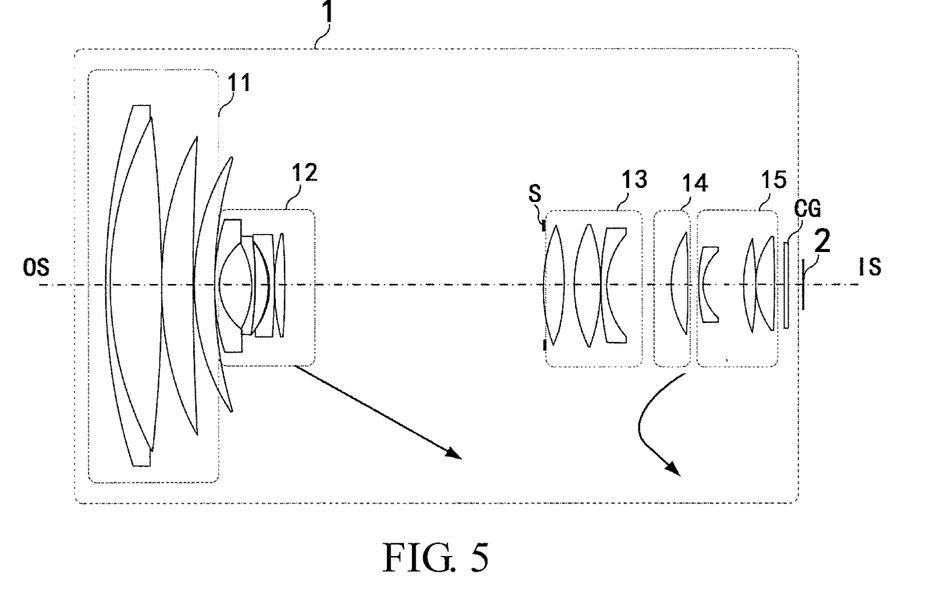
FIG. 5 shows a schematic diagram of an optical system according to a fifth embodiment of the invention.

FIG. 5 shows a schematic diagram of an optical system according to a fifth embodiment of the invention. The detailed optical data of the optical system A according to the fifth embodiment are shown in Tables 13-15 below.

TABLE 13

| Surface number | Radius (mm) | Interval (mm) | Refractive index (nd) | Abbe number (vd) |
|---|---|---|---|---|
| S1 | 80.07 | 0.60 | 1.88 | 25.8 |
| S2 | 48.68 | 6.82 | 1.43 | 95.1 |
| S3 | −238.58 | 0.10 | | |
| S4 | 45.39 | 4.37 | 1.49 | 81.6 |
| S5 | 363.37 | 0.10 | | |
| S6 | 33.69 | 2.73 | 1.49 | 81.6 |
| S7 | 66.62 | Variable | | |
| S8 | 160.85 | 0.60 | 1.88 | 40.7 |
| S9* | 8.11 | 4.04 | | |
| S10* | −13.09 | 0.60 | 1.88 | 40.7 |
| S11 | −45.95 | 0.10 | | |
| S12 | −36.10 | 1.38 | 1.92 | 18.8 |
| S13 | −11.99 | 0.51 | | |
| S14 | −9.41 | 0.60 | 1.88 | 40.7 |
| S15 | −46.88 | 0.10 | | |
| S16* | 28.95 | 0.93 | 1.92 | 18.8 |
| S17* | 9093.29 | Variable | | |
| S18* | 19.25 | 2.63 | 1.6 | 37.2 |
| S19* | −24.47 | 1.39 | | |
| S20 | 17.62 | 3.48 | 1.49 | 81.6 |
| S21 | −25.26 | 0.10 | | |
| S22 | 34.65 | 0.60 | 1.92 | 18.8 |
| S23 | 10.52 | Variable | | |
| S24 | 13.71 | 2.23 | 1.53 | 72.5 |
| S25 | −78.18 | Variable | | |
| S26* | 25.95 | 0.60 | 1.88 | 36 |
| S27* | 5.77 | 5.40 | | |
| S28 | 16.50 | 1.62 | 1.49 | 81.5 |
| S29 | −70.97 | 0.10 | | |
| S30 | 10.13 | 2.33 | 1.85 | 37.3 |
| S31 | −711.29 | 0.10 | | |
| S32 | Inf. | 1.20 | | |
| S33 | Inf. | 0.50 | 1.51 | 64.1 |
| S34 | Inf. | 2.00 | | |

TABLE 14

| Surface number | S9* | S10* | S16* | S17* | S18* | S19* | S26* | S27* |
|---|---|---|---|---|---|---|---|---|
| $4^{th}$ | 0.000279 | 0.0001664 | −4.919E−05 | 1.4E−05 | −7.7E−05 | 7.25E−05 | −7.4E−05 | −3.41E−004 |
| $6^{th}$ | −8.3E−06 | −8.69E−06 | −1.137E−06 | −1.1E−06 | −1.5E−08 | −1.6E−07 | 1.39E−06 | −7.75E−006 |
| $8^{th}$ | 1.84E−07 | 2.491E−07 | −2.184E−09 | −1.3E−08 | 2.67E−10 | 1.42E−09 | 6.26E−08 | 7.24E−008 |
| $10^{th}$ | −2E−09 | −6.1E−09 | 2.761E−10 | 3.59E−10 | −1.3E−11 | −7.3E−12 | −6E−10 | −7.78E−009 |
| $12^{th}$ | 8.76E−12 | 1.323E−10 | 0 | 0 | 0 | 0 | 0 | 0 |

TABLE 15

| Surface number | EFL = 4.5 mm wide-angle position | EFL = 71 mm intermediate zoom position | EFL = 136 mm telephoto position |
|---|---|---|---|
| S7 | 0.23 | 31.32 | 34.83 |
| S17 | 34.80 | 3.71 | 0.20 |
| S23 | 8.73 | 0.60 | 9.63 |
| S25 | 1.38 | 9.51 | 0.48 |

As can be verified from the above tables, a total number of lenses with refractive power of all the lens groups is 16. Refractive powers of the first lens group 11 to the fifth lens group 15 are positive, negative, positive, positive and positive. Both surfaces of the first lens and the last lens of the second lens group 12 are aspheric surfaces. Both surfaces of the first lens of the fifth lens group 15 are aspheric surfaces. The first lens group 11 includes a cemented lens that is a cemented doublet. Besides, in this embodiment, a total track length (TTL) of the optical lens 1 is about 93 mm, an F-number of the optical lens 1 is in the range of 1.6 (wide-angle position) to 3.6 (telephoto position), and a maximum zoom ratio of the optical lens 1 is about 30. The zooming and focusing operations of each lens group are similar to those of the fourth embodiment and thus are not repeatedly explained in detail.

According to the above embodiments, in one aspect, focal lengths of the optical system A or the optical lens 1 in the wide-angle position, the intermediate zoom position and the telephoto position are in respective ranges of 3-7 mm, 40-90 mm and 100-250 mm, and more preferably in respective ranges of 4.5-4.8 mm, 56-71 mm and 136-200 mm.

In one aspect of the invention, a minimum zoom ratio of the optical lens 1 in the wide-angle position is in the range of 1-3 and more preferably 1. A maximum zoom ratio of the optical lens 1 in the telephoto position is in the range of 10-45, and more preferably in the range of 28.75-40. Further, an F-number of the optical lens 1 is in the range of 1.2 (wide-angle position) to 6 (telephoto position), and more preferably in the range of 1.2-2 (wide-angle position) and 4-5 (telephoto position).

Further, a total track length of the optical lens 1 in the wide-angle position is 120 mm or less, and more preferably in the range of 91.39-93 mm.

Besides, in one embodiment, a ratio D/L of the optical system A is set to be 8 or larger to enhance optical performance, where D denotes a total track length and L denotes a diagonal length of a light-sensing surface of the image sensor 2. It is preferred that the ratio D/L is 10 or larger, and more preferably 12 or larger to further enhance optical performance. In case the ratio D/L is smaller than 40, the cost-performance ratio of the optical system A is comparatively high. Taking the first embodiment as an example, D is about 92.78 mm, L is about 7.182 mm, and D/L is about 12.9.

Further, optical performance of the optical system A may be enhanced when a ratio $I_C/TTL_w$ of the optical system A is smaller than about 0.07, where $I_C$ denotes an image circle/height that is equal to half a diagonal length L of a light-sensing surface of the image sensor 2, and $TTL_w$ denotes a total track length in the wide-angle position. It is preferred that the ratio $I_C/TTL_w$ is in the range of 0.03-0.05 or 0.03-0.045, and more preferably in the range of 0.035-0.04 to further improve optical performance. Taking the first embodiment as an example, Ic is about 3.6 mm, $TTL_w$ is about 92.8 mm, and $I_C/TTL_w$ is about 0.04.

Moreover, according to one aspect of the invention, a relative illumination (Ri) of the optical lens 1 is in the range of about 30%-90% to reduce the shading phenomenon of an image. The shading phenomenon is a reduction of an image's brightness or saturation at the periphery compared to the image center. The shading phenomenon of an image can be essentially reduced on the condition that the relative illumination is larger than 33% and can be significantly reduced under a relative illumination of larger than 50%.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the number of lenses of each lens group or optical parameters such as refractive power for each lens may be changed, or a lens without affecting the overall optical performance may be additionally provided. It is intended that the scope of the invention be defined by the claims appended hereto and their equivalents in which all terms are meant in their broadest reasonable sense unless otherwise indicated.

What is claimed is:

1. An optical lens arranged in order from a magnified side to a minified side, comprising:
    a first lens group with refractive power comprising at least two lenses with positive refractive power;
    a second lens group with refractive power comprising an aspheric lens, and a total number of lenses with refractive power of the second lens group being no less than four;
    a third lens group with refractive power and comprising a cemented triplet, the cemented triplet having three lenses, the three lenses comprising a lens with positive refractive power and a lens with negative refractive power, and a total number of lenses with refractive power of the third lens group being no less than four;
    a fourth lens group with refractive power comprising a lens with negative refractive power;
    a fifth lens group with refractive power, a distance between the first lens group and the fifth lens group being fixed, a distance between the third lens group and the fifth lens group being fixed, a distance between the second lens group and the fifth lens group being variable, and a distance between the fourth lens group and the fifth lens group being variable; and
    an aperture stop disposed between the second lens group and the third lens group.

2. The optical lens as claimed in claim 1, wherein the lens with negative refractive power of the fourth lens group has at least one aspheric surface, the three lenses of the cemented triplet of the third lens group are a first lens, a second lens and a third lens arranged from a magnified side to a minified side, a refractive index of the first lens and a refractive index of the third lens are smaller than the refractive index of the second lens, and an Abbe number of the first lens and an Abbe number of the third lens are larger than an Abbe number of the second lens.

3. The optical lens as claimed in claim 1, wherein, when the optical lens is changed from a wide-angle position to a telephoto position, the second lens group is moved in only one direction toward the fifth lens group, and a total number of lenses with refractive power of the first lens group being no less than four.

4. The optical lens as claimed in claim 3, wherein, when the optical lens is changed from a wide-angle position to a telephoto position, the fourth lens group comprises movement toward the first lens group and movement toward the fifth lens group.

5. The optical lens as claimed in claim 1, wherein the optical lens comprises no less than fifteen lenses with refractive power and the cemented triplet comprises two lenses with positive refractive power.

6. The optical lens as claimed in claim 5, wherein the optical lens satisfies the condition:
    $D/L \geq 10$, where D is a total track length of the optical lens, and L is a diagonal length of a light-sensing surface of an image sensor.

7. The optical lens as claimed in claim 5, wherein a maximum zoom ratio of the optical lens is in the range of 26-40.

8. The optical lens as claimed in claim 7, wherein refractive powers of the first lens group, the second lens group, the third lens group and the fifth lens group are positive, negative, positive and positive, the three lenses of the cemented triplet of the third lens group are a first lens, a second lens and a third lens arranged from a magnified side to a minified side, a refractive index of the first lens and a refractive index of the third lens are smaller than the refractive index of the second lens, and an Abbe number of the first lens and an Abbe number of the third lens are larger than an Abbe number of the second lens.

9. The optical lens as claimed in claim 7, wherein the fourth lens group comprises a lens with negative refractive power having at least one aspheric surface.

10. The optical lens as claimed in claim 7, wherein each of the first lens group and the second lens group has a cemented lens.

11. The optical lens as claimed in claim 7, wherein, when the optical lens is changed from a wide-angle position to a telephoto position, the second lens group is moved in only one direction toward the fifth lens group, and the fourth lens group comprises movement toward the first lens group and movement toward the fifth lens group.

12. The optical lens as claimed in claim 1, wherein refractive powers of the first lens group, the second lens group, the third lens group and the fifth lens group are positive, negative, positive and positive.

13. The optical lens as claimed in claim 1, wherein the aperture stop remains stationary during zooming and focusing of the optical lens.

14. The optical lens as claimed in claim 1, wherein a maximum zoom ratio of the optical lens is in the range of 26-40.

15. The optical lens as claimed in claim 1, wherein an F-number of the optical lens is in the range of 1.2-2 in a wide-angle position and 4-5 in a telephoto position.

16. The optical lens as claimed in claim 1, wherein a total track length of the optical lens in a wide-angle position is in the range of 91.31 mm-120 mm.

17. The optical lens as claimed in claim 1, wherein the optical lens satisfies the condition:

IC/TTLw<0.07, where IC denotes an image circle of a light-sensing surface of an image sensor and TTLw denotes a total track length in the wide-angle position of the optical lens.

18. The optical lens as claimed in claim 1, wherein the optical lens further comprises an image sensor, and a relative illumination of the optical lens measured on the image sensor is in the range of 30%-90%.

19. The optical lens as claimed in claim 1, comprising fifteen lenses or more with refractive power, wherein the first lens group with positive refractive power is a fixed group comprising at least four lenses, at least two lenses in the first lens group forms a cemented lens, the second lens group with negative refractive power is a movable group comprising four lenses, one of the lenses in the second lens groups having negative refractive power with at least one aspheric surface, at least two lenses in the second lens group form a cemented lens, the third lens group with positive refractive power is a fixed group comprising four lenses and at least two lenses in the third lens group form a cemented lens, the fourth lens group is a movable group comprising at least one lens, and the fifth lens group is a fixed group with positive refractive power comprising at least two lenses, when the optical lens is changed from a wide-angle position to a telephoto position, the second lens group is moved in only one direction toward the fifth lens group, and the fourth lens group comprises movement toward the first lens group and movement toward the fifth lens group.

\* \* \* \* \*